Feb. 17, 1925.
W. DAVIS
1,527,151
COMBINED ACCELERATOR AND BRAKE CONTROLLING MECHANISM
Filed March 19, 1923  2 Sheets-Sheet 1
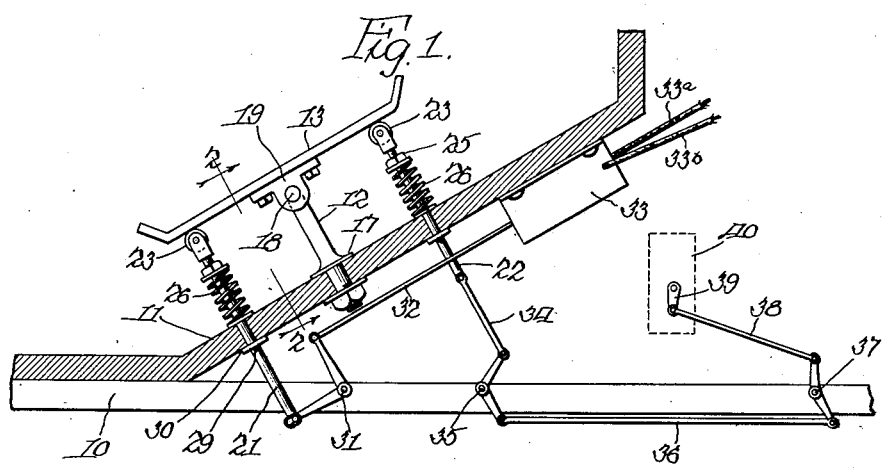
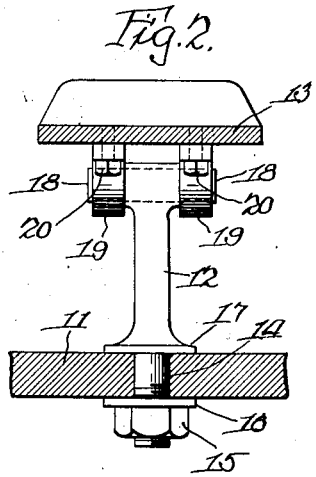
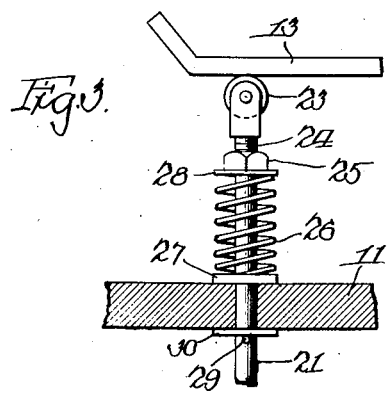

Feb. 17, 1925.
W. DAVIS
1,527,151
COMBINED ACCELERATOR AND BRAKE CONTROLLING MECHANISM
Filed March 19, 1923    2 Sheets-Sheet 2
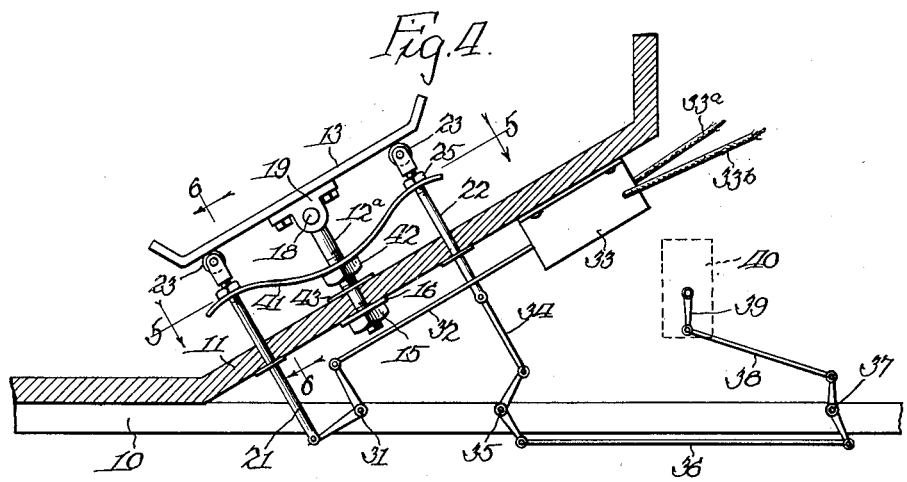
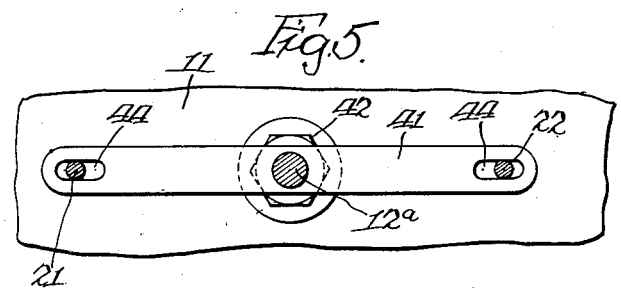
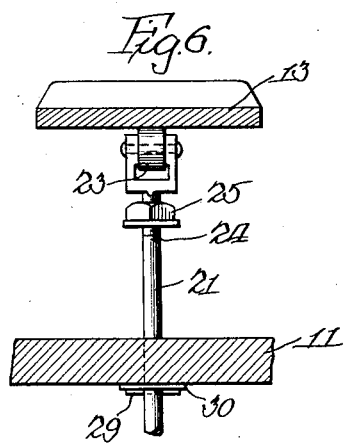
Inventor:
William Davis:

Patented Feb. 17, 1925.

1,527,151

UNITED STATES PATENT OFFICE.

WILLIAM DAVIS, OF CHICAGO, ILLINOIS.

COMBINED ACCELERATOR AND BRAKE-CONTROLLING MECHANISM.

Application filed March 19, 1923. Serial No. 626,059.

*To all whom it may concern:*

Be it known that I, WILLIAM DAVIS, a citizen of the United States, a resident of Chicago, in the county of Cook and State of Illinois, have invented certain new and useful Improvements in Combined Accelerator and Brake-Controlling Mechanism, of which the following is a specification.

This invention relates, generally, to improvements in means for operating valved and pressure or friction applying devices whereby operative parts connected to said devices may be so actuated by said means as to properly and accurately control the action or operation thereof, but has particular relation to controlling means for accelerators and brakes of motor-driven vehicles, and especially those of automobiles.

While the invention is more particularly intended for use in connection with and for controlling the operation of an accelerator of a well known type, and in connection with and for controlling a variable resistance for a motor, such as is disclosed in Patent No. 1,149,500 issued to me on the 27th day of March, 1923, for controlling mechanism for electric motors, and while I have so shown it in the accompanying drawings and will hereinafter so describe it, yet, I wish it to be distinctly understood that I do not desire to be limited in its application or use but may employ it wherever and for any use that it may be found applicable, without a departure from the spirit of the invention.

The principal object of the invention, is the provision of a controlling mechanism of the above named general character, which shall be of such construction, arrangement and operation of its parts that a unit, or unitary device is afforded for controlling the accelerator and brake, or rather, for controlling operative parts or connections leading to an accelerator and a brake, or their equivalents, without the necessity of employing a separate device for each, as has heretofore been the general practice.

Another object of the invention, is to furnish a mechanism of the class recited, which shall be extremely simple and inexpensive in construction, strong, durable, and efficient in operation, as well as being easily installed.

Other objects and advantages will become apparent from the following description and explanation.

The invention will be explained and more readily understood when read in conjunction with the accompanying drawings, in which various arrangements of which the invention is susceptible is illustrated, it being obvious that changes and modifications may be resorted to without departing from the spirit of the invention, so long as they come within the scope of the appended claims forming a part hereof.

Referring to the drawings,—

Fig. 1 is a view partly in section and partly in elevation of the front parts of an automobile frame and its body, showing a controlling mechanism embodying one form of the invention mounted thereon with its parts in their normal positions.

Fig. 2 is an enlarged sectional view taken on line 2—2 of Fig. 1 looking in the direction indicated by the arrows.

Fig. 3 is an enlarged view partly in section and partly in elevation of a portion of the automobile body and a part of the foot supporting member of the device, showing the construction and arrangement of the parts of one of the reciprocating rods of said device.

Fig. 4 is a view similar to Fig. 1 illustrating a modification in the construction of the mechanism.

Fig. 5 is a plan sectional view taken on line 5—5 of Fig. 4, and

Fig. 6 is a detail sectional view taken on line 6—6 of Fig. 4 looking in the direction indicated by the arrows.

Like numerals of reference refer to like parts throughout the different views of the drawings.

Referring now to Figs. 1 to 3 inclusive, the reference numeral 10 designates a portion of the chassis or frame of an automobile on which is mounted in the usual or any well known way the body of the automobile, the front portion 11 only of which is shown in the drawings.

Mounted on this front portion 11 or foot rest portion of the automobile body is a standard 12 which supports the foot rest 13 of the controlling mechanism. The standard 12 is by preference provided at its lower end with a reduced and screw-threaded portion 14 which is extended through a suitable opening in the body 11 and has secured on its lower portion a nut 15 and a washer 16 used in conjunction with an annular flange 17 on the standard 12 at the upper end of its reduced portion 14 for rigidly securing the standard on the support 11 therefor. The upper end of the standard 12 is preferably of T-shape to provide bearings 18 for the bearing clips 19, one of which is located on each side of the standard 12 and around one of the bearings 18 and is secured by means of bolts 20 or otherwise to the bottom of the foot rest 13 for the operator. As shown, this foot rest has its ends upturned to prevent accidental forward or rearward displacement of the foot of the operator, and it will be understood that the rest 13 may be made of any suitable size, form and material, the bearing clips 19 thereof being secured thereto so that its axis will be disposed transversely with respect to the foot rest.

Mounted for reciprocation or vertical movement through suitable openings in the portion 11 of the automobile body, rearwardly and in front of the standard 12 at suitable distances therefrom are controlling rods 21 and 22 each of which has mounted or carries on its upper end a caster or roller 23 to contact with the lower surface of the foot rest 13, the said rollers having their axes transversely with respect to said foot rest, as shown. Below its caster or roller 23, each of said rods is screw-threaded as at 24 for engagement with a nut 25 employed for regulating the tension of the springs 26 one of which surrounds each of the rods 21 and 22 above the portion 11 of the automobile floor and rests at its lower end on a washer 27 and at its upper end against another washer 28 interposed between the spring and nut 25.

At a suitable distance below the portion 11 of the automobile floor, each of the controlling rods 21 and 22 is provided with a stop member 29 which may be in the form of a pin extended transversely through an opening in said rod. These pins are employed for the purpose of restricting the upward movement of the controlling rods 21 and 22, for it is apparent that by reason of the tension of the springs 26, said rods will be moved upwardly through their bearings in the portion 11 of the automobile body until their stop members 29 strike the lower surface of the portion 11 or a washer 30 located around each of the controlling rods and mounted on the lower surface of the portion 11 as contacting plates for said stop members. By means of the nuts 25, it is manifest that the tension of the springs 26 may be regulated, but it will be understood that said nuts may be dispensed with without a departure from the invention.

One of the controlling rods, for instance the one indicated by the reference numeral 21, is pivotally and loosely connected to one arm of a bell crank lever 31, which is suitably fulcrumed on a support below the portion 11 and usually on the frame 10 of the automobile. The other arm of the bell crank lever 31 has pivotally connected thereto one end of a link 32, the other end of which is connected to a switch of a variable resistance designated as a whole by the numeral 33 of the type disclosed in my above named application Serial Number 567,872, which it is deemed unnecessary to herein illustrate or describe, as it will be understood that the connecting link or rod 32 can be employed for actuating other elements. The other controlling rod, say 22, has pivotally connected to its lower end a link 34 the other end of which is pivotally connected to one arm of a bell crank lever 35 suitably fulcrumed below the supporting portion 11 and usually on the frame 10.

Pivotally connected at one of its ends to the other arm of the lever 35 is a link 36 which has its other end pivotally connected to one arm of a bell crank lever 37 fulcrumed on the frame 10, the other arm of the last named lever having pivotally connected thereto one end of a link 38 which is operatively connected at its other end to the throttle valve 39 of a carbureter 40 of a well known type, which carbureter is located and supported in a usual place and manner on the automobile.

In Figs. 4 to 6 inclusive of the drawings is shown a modification in the construction of the device, which consists mainly in omitting the coiled springs 26 of the first described construction and substitute therefor a bow spring 41 for the actuation in one direction of the controlling rods 21 and 22 of the mechanism. This modification consists further in a slight change in the construction of the supporting standard for the tiltable member 13 or foot rest for the operator. As is clearly shown in Fig. 4, the modified form of the supporting standard 12$^a$ has the shoulder 17 of the former type of standard 12 omitted therefrom, and is provided with a screw-threaded portion just above the portion 11 of the automobile body for engagement with a nut 42 used for regulating the modified form of spring 41 as well as for engagement with a washer 43 employed in conjunction with the nut 15 and washer 16 on the lower portion of the standard 12$^a$ for firmly securing each to the portion 11. The modified form of spring 41 is of a bow shape as shown, and has near each of its ends a longitudinally disposed slot 44 for the reception and operation of the controlling rods 21 and 22 which in the modified construction are identical in construction with those employed in the first above described structure, except that the washers 27 of said structure are omitted as unnecessary.

In the modified form it is evident that the tension of the spring 41 can be regulated by turning the nut 42 in the proper direction and also that each end of the spring 41 can be so adjusted by turning the nut 21 at said end in the proper direction to increase or decrease the tension of that arm of the spring 41 adjacent said nut. The connections uniting the controlling rods 21 and 22 to the parts to be operated by the mechanism, are the same in the modified construction as in the first described construction, and it will be understood that the functions performed by the modification are the same as those performed by the first described construction.

From the foregoing and by reference to the drawings, it will be readily understood and clearly seen that by my improvements a unitary device for controlling the accelerator and for controlling the brake mechanism is furnished, for it is obvious that by placing the foot of the operator on the tiltable member or foot rest 13, either of the controlling rods 21 or 22 can be depressed by tilting the member 13 in the proper direction, and that in so doing, the other rod will be maintained in its normal position by reason of its spring-actuated construction. For example, if it is desired to open the throttle valve of the carbureter 40 so as to accelerate the speed of the machine, the tiltable member 13 can be tilted forwardly and downwardly to any desired degree so as to open the throttle valve to a more or less extent. On the other hand, if it is desired to vary the speed of the motor so as to apply a variable force to the brakes, the tiltable member 13 can be tilted rearwardly and downwardly, which will depress the rod 21 and thereby cause the switch of the variable resistance 33 to be so operated as to increase the speed of the motor and thereby increase the friction or force of the brakes. It will be understood that the variable resistance 33 has a conductor 33ª leading to a battery which is grounded by being connected with any suitable part of the vehicle frame and that said resistance also has a conductor leading to the motor, not shown, which is also grounded in a similar manner to the battery, not shown.

The brake mechanism, (not herein shown) is driven by the motor and is operatively connected to the motor as disclosed in my aforesaid co-pending application.

While I have shown the controlling rods 21 and 22 equipped at their upper ends with an anti-friction roller, yet it is apparent these rollers may be omitted and the upper ends of said rods can be rounded for contact with the tiltable member so as to reduce friction between said elements. It is manifest that by employing the construction shown in Fig. 4, the spring tension for the controlling rods can be regulated by turning the nut 42 in the proper direction, or if it is desired, the individual tension for each rod can be regulated by means of the nut 25 thereon.

Having thus fully described my invention, what I claim as new and desire to secure by Letters Patent, is:

1. In a device of the class described, the combination with an upwardly extending supporting standard, of a member tiltably mounted thereon, vertically disposed controlling rods mounted for reciprocation on opposite sides of said standard and adapted for detachable contact with and to be moved in one direction by said tiltable member, and means operatively connecting each of said rods to a part to be operated thereby.

2. In a device of the class described, the combination with an upwardly extended supporting standard, of a member mounted thereon for longitudinal tiltable movement, vertically disposed controlling rods mounted for reciprocation on opposite sides of said standard and adapted for detachable contact with and to be moved in one direction by said tiltable member, and means operatively connecting each of said rods to a part to be operated thereby.

3. In a device of the class described, the combination with an upwardly extended supporting standard, of a member tiltably mounted thereon, vertically disposed controlling rods mounted for reciprocation on opposite sides of said standard and adapted for detachable contact with and to be moved in one direction by said tiltable member, means co-acting with each of said rods to restore it to its normal position after being reciprocated in one direction by the tiltable member, and means operatively connecting each of said rods to a part to be operated thereby.

4. In a device of the class described, the combination with an upwardly extended supporting standard, of a member tiltably mounted thereon, vertically disposed spring actuated controlling rods mounted for reciprocation on opposite sides of said standard and adapted for detachable contact with and to be moved in one direction by said tiltable member, and means operatively connecting each of said rods to a part to be operated thereby.

5. A device of the class described including in combination an upwardly extended supporting standard, a member tiltably mounted thereon, vertically disposed spring-actuated controlling rods mounted for reciprocation on opposite sides of said standard and adapted to be moved against its spring tension by said tiltable member.

6. In a device of the class described, the combination with a supporting standard, of a member tiltably mounted thereon, spring-actuated controlling rods mounted for reciprocation on opposite sides of said standard and adapted to be moved in one direction by said tiltable member, means for adjusting the spring tension of said rods, and means operatively connecting each of said rods to a part to be operated thereby.

7. In a device of the class described, the combination with a supporting standard, of a member tiltably mounted thereon, individually spring-actuated controlling rods mounted for reciprocation on opposite sides of said standard and adapted to be moved in one direction by said tiltable member, and means operatively connecting each of said rods to a part to be operated thereby.

8. In a device of the class described, the combination with a supporting standard, of a member tiltably mounted thereon, controlling rods mounted for reciprocation on opposite sides of said standard each having anti-friction means to impinge against said tiltable member, said rods adapted to be moved in one direction by said member, and means operatively connecting each of said rods to a part to be operated thereby.

9. In a device of the class described, the combination with a supporting standard, of a member tiltably mounted thereon, spring-actuated controlling rods mounted for reciprocation on opposite sides of said standard and each having an anti-friction roller at one of its ends to contact with said member, said rods adapted to be moved in one direction by said tiltable member, and means operatively connecting each of said rods to a part to be operated thereby.

10. In a device of the class described, the combination with a supporting standard, of a member tiltably mounted thereon, spring-actuated controlling rods mounted for reciprocation on opposite sides of said standard and adapted to be moved in one direction by said tiltable member, means to regulate the spring tension of said rods, a roller on one end of each of said rods to contact with said member, and means operatively connecting each of said rods to a part to be operated thereby.

11. A device of the class described including in combination a supporting standard, a member tiltably mounted thereon, controlling rod mounted for reciprocation on opposite sides of said standard and adapted to be moved in one direction by said tiltable member, a spring surrounding each of said rods and arranged to exert its tension on said rod in the opposite direction from the movement thereof by the tiltable member, and means on each of said rods to regulate the tension of its spring.

WILLIAM DAVIS.